US010826664B2

United States Patent
Liu et al.

(10) Patent No.: US 10,826,664 B2
(45) Date of Patent: Nov. 3, 2020

(54) REFERENCE SIGNAL SENDING METHOD, RELATED DEVICE, AND COMMUNICATIONS SYSTEM

(71) Applicant: Huawei Technologies Co., Ltd., Shenzhen (CN)

(72) Inventors: Yong Liu, Shanghai (CN); Lu Wu, Shenzhen (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/242,787

(22) Filed: Jan. 8, 2019

(65) Prior Publication Data

US 2019/0149301 A1 May 16, 2019

Related U.S. Application Data

(63) Continuation of application No. PCT/CN2017/083822, filed on May 10, 2017.

(30) Foreign Application Priority Data

Jul. 13, 2016 (CN) .......................... 2016 1 0554273

(51) Int. Cl.
*H04L 5/00* (2006.01)
*H04L 25/02* (2006.01)
(Continued)

(52) U.S. Cl.
CPC ......... *H04L 5/0051* (2013.01); *H04B 7/0617* (2013.01); *H04L 5/00* (2013.01);
(Continued)

(58) Field of Classification Search
CPC ... H04L 5/0051; H04L 5/0048; H04L 5/0094; H04L 25/0224; H04L 27/2626; H04L 5/00; H04L 5/0023; H04B 7/0617
See application file for complete search history.

(56) References Cited

U.S. PATENT DOCUMENTS

| 2012/0120905 A1 | 5/2012 | Ko et al. |
| 2013/0070719 A1 | 3/2013 | Xu et al. |

(Continued)

FOREIGN PATENT DOCUMENTS

| CN | 101355412 A | 1/2009 |
| CN | 102088309 A | 6/2011 |

(Continued)

*Primary Examiner* — Brian D Nguyen
(74) *Attorney, Agent, or Firm* — Leydig, Voit & Mayer, Ltd.

(57) ABSTRACT

Embodiments of present invention disclose a reference signal sending method. The method includes: determining a time-frequency resource occupied by a reference signal of at least one antenna port in a transmission unit, the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port; and sending the reference signal to user equipment on the time-frequency resource. In the embodiments of present invention, a reference signal mapping rule and an antenna port mapping solution that are applicable to an NR MIMO system are formulated.

20 Claims, 7 Drawing Sheets

(51) Int. Cl.
*H04L 27/26* (2006.01)
*H04B 7/06* (2006.01)
(52) U.S. Cl.
CPC ........ *H04L 5/0094* (2013.01); *H04L 25/0224* (2013.01); *H04L 27/2626* (2013.01)

(56) References Cited

U.S. PATENT DOCUMENTS

| | | | |
|---|---|---|---|
| 2013/0089065 A1 | 4/2013 | Koorapaty et al. | |
| 2016/0127102 A1 | 5/2016 | Kim et al. | |
| 2016/0373231 A1* | 12/2016 | Yoon | H04B 7/08 |
| 2017/0078061 A1* | 3/2017 | Sawahashi | H04L 27/2698 |
| 2017/0195100 A1* | 7/2017 | Kim | H04B 7/06 |
| 2017/0201307 A1* | 7/2017 | Kim | H04B 7/04 |
| 2017/0202014 A1* | 7/2017 | Moon | H04B 7/0626 |
| 2017/0214507 A1* | 7/2017 | Kang | H04B 7/065 |
| 2019/0068352 A1* | 2/2019 | Xiong | H04L 5/0039 |
| 2019/0149212 A1* | 5/2019 | Wang | H04B 7/0626 370/329 |

FOREIGN PATENT DOCUMENTS

| | | |
|---|---|---|
| CN | 102263723 A | 11/2011 |
| CN | 104158574 A | 11/2014 |

\* cited by examiner

… (1)

REFERENCE SIGNAL SENDING METHOD, RELATED DEVICE, AND COMMUNICATIONS SYSTEM

CROSS-REFERENCE TO RELATED APPLICATIONS

This application is a continuation of International Application No. PCT/CN2017/083822, filed on May 10, 2017, which claims priority to Chinese Patent Application No. 201610554273.X, filed on Jul. 13, 2016. The disclosures of the aforementioned applications are hereby incorporated by reference in their entireties.

TECHNICAL FIELD

Embodiments of the present invention relate to the field of communications technologies, and in particular, to a reference signal sending method, a related device, and a communications system.

BACKGROUND

In Long Term Evolution (LTE) release 8 (R8)/R9, a common reference signal (CRS) is designed to measure channel quality. User equipment (UE) may perform channel measurement by using the CRS, so that the UE determines to perform cell reselection and handing over to a target cell. In LTE R10, to further improve average cell spectrum utilization, cell-edge spectrum utilization, and a throughput of each UE, a channel state information reference signal (CSI-RS) is defined. The CSI-RS is used for channel measurement. The channel measurement performed by using the CSI-RS may be used to calculate a precoding matrix index (PMI), a channel quality information indicator (CQI), and a rank indicator (RI) that need to be fed back by the UE to a base station (eNB). In R10, CSI-RSs are sparsely distributed in both time domain and frequency domain. The sparsely distributed CSI-RSs can support an 8-antenna configuration of an eNodeB, and greatly support a neighboring-cell measurement configuration. The 3rd Generation Partnership Project (3GPP) #61bis standard meeting approved a CSI-RS pilot mapping pattern. Specifically, referring to FIG. 1, FIG. 1 is a CSI-RS pilot mapping pattern corresponding to eight antennas. In FIG. 1, CSI-RSs are mapped to different resource elements (RE) in a distributed mapping manner.

In a 3GPP wireless access system, an eNB may have a plurality of antennas that are used to perform transmission with UE, allowing the eNB to use a multiple-input multiple-output (MIMO) technology. MIMO uses a plurality of antennas at a transmitter and a receiver to improve communication performance. By using a resource in a space dimension, the MIMO technology allows a signal to obtain an array gain, a multiplexing gain, a diversity gain, and a co-channel interference reduction gain in space without increasing system bandwidth, thereby exponentially increasing a capacity and spectral efficiency of a communications system. Therefore, since emergence of MIMO, MIMO has attracted people's attention. In a fifth generation (5G) mobile communications technology, the MIMO technology that can significantly increase a system capacity is still an important technology used to satisfy a requirement of a new radio access technology (New RAT) for high-speed transmission. In addition, as a high-order spectrum in 5G is used, a quantity of antennas in the communications system is further increased, to implement high-frequency transmission with large/wide coverage. Massive MIMO is becoming a focus of study.

For a massive MIMO system operating on a relatively low frequency (such as 4 GHz), a most effective method to achieve high spatial degree of freedom is to use one radio frequency (RF) channel after each antenna element. This is also an implementation architecture widely used in the industry. Frequency-selective beamforming can be implemented in baseband digital domain by using such an architecture. The beamforming solution is referred to as fully digital beamforming. Obviously, in consideration of RF channel costs and system architecture complexity, the architecture is feasible when a quantity of antenna elements is relatively small or moderate. However, when the quantity of antenna elements becomes increasingly large, for example, when the quantity reaches 256 or larger, a price performance ratio of the fully digital beamforming architecture is unfavorable. In this case, analog beamforming and hybrid beamforming emerge. In the foregoing two solutions, a quantity of RF channels used by the system is less than a quantity of antenna elements, and each RF channel drives a plurality of antenna elements by using a static/semi-static analog weight.

An important characteristic of 5G New Radio (NR) is using both a low frequency and a high frequency. On a high frequency spectrum, a path loss is quite severe. To overcome the disadvantage, a larger-scale antenna array is used in a system to implement beam-based transmission, and a quantity of antenna elements is up to 256, 512, or even 1024. In this case, the analog/hybrid beamforming architecture is more economical.

With application of the analog/hybrid beamforming architecture to the NR system, the new beamforming structure requires a particular channel measurement reference signal design, including a totally new resource mapping rule, antenna port mapping solution, and CSI reference signal pilot pattern. However, the foregoing CSI-RS pilot mapping manner is not well adapted to the analog/hybrid beamforming architecture, because analog/hybrid beamforming is implemented by hardware in time domain and is wideband beamforming. In other words, only one analog beam can be measured at a time point. Therefore, if a plurality of analog beams need to be measured, reference signals corresponding to ports related to the analog beams need to be mapped at different time points. However, in a prior-art structure, each port may be mapped to a different symbol, and this means that a mapped-to symbol can be used to measure only one analog beam. This is obviously inappropriate.

Therefore, how to design and formulate a new channel information measurement reference signal mapping rule and a new antenna port mapping solution based on the NR beamforming structure becomes a problem to be urgently resolved in the NR MIMO system.

SUMMARY

Embodiments of the present invention provide a reference signal sending method, a related device, and a communications system, and formulate a reference signal mapping rule and an antenna port mapping solution that are applicable to an NR MIMO system.

According to a first aspect, an embodiment of the present invention provides a reference signal sending method, where the method includes: determining, by an access network device, a time-frequency resource occupied by a reference signal of at least one antenna port in a transmission unit, where the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port; and sending, by the access network device, the reference signal to user equipment on the time-frequency resource.

According to the foregoing steps, reference signals of a plurality of antenna ports are mapped together, thereby improving reference signal transmission efficiency.

With reference to the first aspect, in a first implementation of the first aspect, after the determining, by an access network device, a time-frequency resource occupied by a reference signal of at least one antenna port in a transmission unit, and before the sending, by the access network device, the reference signal to user equipment on the time-frequency resource, the method further includes: configuring, by the access network device, the time-frequency resource based on a target reference signal density value; and the method further includes: sending, by the access network device, the target reference signal density value to the user equipment.

According to the foregoing steps, the access network device can flexibly configure a mapping density of the reference signal.

With reference to the first implementation of the first aspect, in a second implementation of the first aspect, the sending, by the access network device, the target reference signal density value to the user equipment includes: adding, by the access network device, the target reference signal density value to a radio resource control (RRC) message, and sending, to the user equipment, the RRC message to which the target reference signal density value has been added; or adding, by the access network device, the target reference signal density value to downlink control information (DCI), and sending, to the user equipment, the DCI to which the target reference signal density value has been added.

With reference to any one of the first aspect or the implementations of the first aspect, in a third implementation of the first aspect, the sending, by the access network device, the reference signal to user equipment on the time-frequency resource includes: sending, by the access network device, the reference signal to the user equipment on the time-frequency resource according to a target cycle; and the method further includes: sending, by the access network device, the target cycle to the user equipment.

According to the foregoing steps, the access network device can flexibly configure the transmission cycle of the reference signal.

With reference to the third implementation of the first aspect, in a fourth implementation of the first aspect, the sending, by the access network device, the target cycle to the user equipment includes: adding, by the access network device, the target cycle to an RRC message, and sending, to the user equipment, the RRC message to which the target cycle has been added; or adding, by the access network device, the target cycle to DCI, and sending, to the user equipment, the DCI to which the target cycle has been added.

With reference to any one of the first aspect or the implementations of the first aspect, in a fifth implementation of the first aspect, the method further includes: sending, by the access network device, reference signal indication information to the user equipment, where the reference signal indication information is used to indicate that the access network device is to send the reference signal of the at least one antenna port to the user equipment. The access network device may transmit the reference signal to the user equipment aperiodically.

With reference to the fifth implementation of the first aspect, in a sixth implementation of the first aspect, the sending, by the access network device, reference signal indication information to the user equipment includes: adding, by the access network device, the reference signal indication information to an RRC message, and sending, to the user equipment, the RRC message to which the reference signal indication information has been added; or adding, by the access network device, the reference signal indication information to DCI, and sending, to the user equipment, the DCI to which the reference signal indication information has been added.

According to a second aspect, an embodiment of the present invention provides a reference signal sending method, where the method includes: receiving, by user equipment, a reference signal that is sent by an access network device on a time-frequency resource, where the time-frequency resource is a time-frequency resource that is occupied by a reference signal of at least one antenna port in a transmission unit and that is determined by the access network device, the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port.

According to the foregoing step, reference signals of a plurality of antenna ports are mapped together, thereby improving reference signal transmission efficiency.

With reference to the second aspect, in a first implementation of the second aspect, the method further includes: receiving, by the user equipment, a target reference signal density value sent by the access network device, where the target reference signal density value is a reference signal density value used by the access network device to configure the time-frequency resource.

With reference to the first implementation of the second aspect, in a second implementation of the second aspect, the receiving, by the user equipment, a target reference signal density value sent by the access network device includes: receiving, by the user equipment, the target reference signal density value that is sent by the access network device by using an RRC message or DCI.

With reference to any one of the second aspect or the implementations of the second aspect, in a third implementation of the second aspect, the method further includes: receiving, by the user equipment, a target cycle sent by the access network device, where the target cycle is a cycle used by the access network device to send the reference signal.

With reference to the third implementation of the second aspect, in a fourth implementation of the second aspect, the receiving, by the user equipment, a target cycle sent by the access network device includes: receiving, by the user equipment, the target cycle that is sent by the access network device by using an RRC message or DCI.

With reference to any one of the second aspect or the implementations of the second aspect, in a fifth implementation of the second aspect, the method further includes: receiving, by the user equipment, reference signal indication information sent by the access network device, where the reference signal indication information is used to indicate that the access network device is to send the reference signal of the at least one antenna port to the user equipment.

With reference to the fifth implementation of the second aspect, in a sixth implementation of the second aspect, the receiving, by the user equipment, reference signal indication information sent by the access network device includes: receiving, by the user equipment, the reference signal indication information that is sent by the access network device by using an RRC message or DCI.

According to a third aspect, an embodiment of the present invention provides an access network device, where the access network device includes a processor, a memory, and a communications module, the memory is configured to store program code for reference signal sending, and the processor is configured to invoke the program code for reference signal sending to perform the following operations:

determining a time-frequency resource occupied by a reference signal of at least one antenna port in a transmission unit, where the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port; and sending the reference signal to user equipment on the time-frequency resource by using the communications module.

According to the foregoing operations, reference signals of a plurality of antenna ports are mapped together, thereby improving reference signal transmission efficiency.

With reference to the third aspect, in a first implementation of the third aspect, after the processor determines the time-frequency resource occupied by the reference signal of the at least one antenna port in the transmission unit, and before the processor sends the reference signal to the user equipment on the time-frequency resource by using the communications module, the processor is further configured to configure the time-frequency resource based on a target reference signal density value; and the processor is further configured to send the target reference signal density value to the user equipment by using the communications module.

According to the foregoing operations, the access network device can flexibly configure a mapping density of the reference signal.

With reference to the first implementation of the third aspect, in a second implementation of the third aspect, the sending, by the processor, the target reference signal density value to the user equipment by using the communications module includes: adding, by the processor, the target reference signal density value to an RRC message, and sending, to the user equipment by using the communications module, the RRC message to which the target reference signal density value has been added; or adding, by the processor, the target reference signal density value to DCI, and sending, to the user equipment by using the communications module, the DCI to which the target reference signal density value has been added.

With reference to any one of the third aspect or the implementations of the third aspect, in a third implementation of the third aspect, the sending, by the processor, the reference signal to user equipment on the time-frequency resource by using the communications module includes: sending, by the processor, the reference signal to the user equipment on the time-frequency resource by using the communications module according to a target cycle; and the processor is further configured to send the target cycle to the user equipment by using the communications module.

According to the foregoing operations, the access network device can flexibly configure the transmission cycle of the reference signal.

With reference to the third implementation of the third aspect, in a fourth implementation of the third aspect, the sending, by the processor, the target cycle to the user equipment by using the communications module includes: adding, by the processor, the target cycle to an RRC message, and sending, to the user equipment by using the communications module, the RRC message to which the target cycle has been added; or adding, by the processor, the target cycle to DCI, and sending, to the user equipment by using the communications module, the DCI to which the target cycle has been added.

With reference to any one of the third aspect or the implementations of the third aspect, in a fifth implementation of the third aspect, the processor is further configured to send reference signal indication information to the user equipment by using the communications module, where the reference signal indication information is used to indicate that the access network device is to send the reference signal of the at least one antenna port to the user equipment. The access network device may transmit the reference signal to the user equipment aperiodically.

With reference to the fifth implementation of the third aspect, in a sixth implementation of the third aspect, the sending, by the processor, reference signal indication information to the user equipment by using the communications module includes: adding, by the processor, the reference signal indication information to an RRC message, and sending, to the user equipment by using the communications module, the RRC message to which the reference signal indication information has been added; or adding, by the processor, the reference signal indication information to DCI, and sending, to the user equipment by using the communications module, the DCI to which the reference signal indication information has been added.

According to a fourth aspect, an embodiment of the present invention provides user equipment, where the user equipment includes a processor, a memory, and a communications module, the memory is configured to store program code for reference signal sending, and the processor is configured to invoke the program code for reference signal sending to perform the following operation: receiving, by using the communications module, a reference signal that is sent by an access network device on a time-frequency resource, where the time-frequency resource is a time-frequency resource that is occupied by a reference signal of at least one antenna port in a transmission unit and that is determined by the access network device, the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port.

According to the foregoing operation, reference signals of a plurality of antenna ports are mapped together, thereby improving reference signal transmission efficiency.

With reference to the fourth aspect, in a first implementation of the fourth aspect, the processor is further configured to receive, by using the communications module, a target reference signal density value sent by the access network device, where the target reference signal density value is a reference signal density value used by the access network device to configure the time-frequency resource.

With reference to the first implementation of the fourth aspect, in a second implementation of the fourth aspect, the receiving, by using the communications module, a target reference signal density value sent by the access network device includes: receiving, by using the communications module, the target reference signal density value that is sent by the access network device by using an RRC message or DCI.

With reference to any one of the fourth aspect or the implementations of the fourth aspect, in a third implementation of the fourth aspect, the processor is further configured to receive, by using the communications module, a target cycle sent by the access network device, where the target cycle is a cycle used by the access network device to send the reference signal.

With reference to the third implementation of the fourth aspect, in a fourth implementation of the fourth aspect, the receiving, by using the communications module, a target cycle sent by the access network device includes: receiving, by using the communications module, the target cycle that is sent by the access network device by using an RRC message or DCI.

With reference to any one of the fourth aspect or the implementations of the fourth aspect, in a fifth implementation of the fourth aspect, the processor is further configured to receive, by using the communications module, reference signal indication information sent by the access network device, where the reference signal indication information is used to indicate that the access network device is to send the reference signal of the at least one antenna port to the user equipment.

With reference to the fifth implementation of the fourth aspect, in a sixth implementation of the fourth aspect, the receiving, by using the communications module, reference signal indication information sent by the access network device includes: receiving, by using the communications module, the reference signal indication information that is sent by the access network device by using an RRC message or DCI.

According to a fifth aspect, an embodiment of the present invention provides an access network device, including a module or a unit configured to perform the reference signal sending method according to any one of the first aspect or the implementations of the first aspect.

According to a sixth aspect, an embodiment of the present invention provides user equipment, including a module or a unit configured to perform the reference signal sending method according to any one of the second aspect or the implementations of the second aspect.

According to a seventh aspect, an embodiment of the present invention provides a communications system, including an access network device and user equipment, where the access network device is the access network device according to the third aspect or the fifth aspect, and the user equipment is the user equipment according to the fourth aspect or the sixth aspect.

With reference to any one of the foregoing aspects, in some implementations of the embodiments of the present invention, the symbol in the first part locates prior to the symbol in the second part.

With reference to any one of the foregoing aspects, in some implementations of the embodiments of the present invention, the single symbol or each of the plurality of consecutive symbols is carried on a beam, where the beam is an analog beam, a digital beam, or a hybrid beam.

With reference to any one of the foregoing aspects, in some implementations of the embodiments of the present invention, when the single symbol or each of the plurality of consecutive symbols carries reference signals of a plurality of antenna ports, reference signals of different antenna ports on the single symbol or each of the plurality of consecutive symbols occupy different subcarriers.

With reference to any one of the foregoing aspects, in some implementations of the embodiments of the present invention, when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

With reference to any one of the foregoing aspects, in some implementations of the embodiments of the present invention, the reference signal is a reference signal used for channel measurement.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Figure 1:
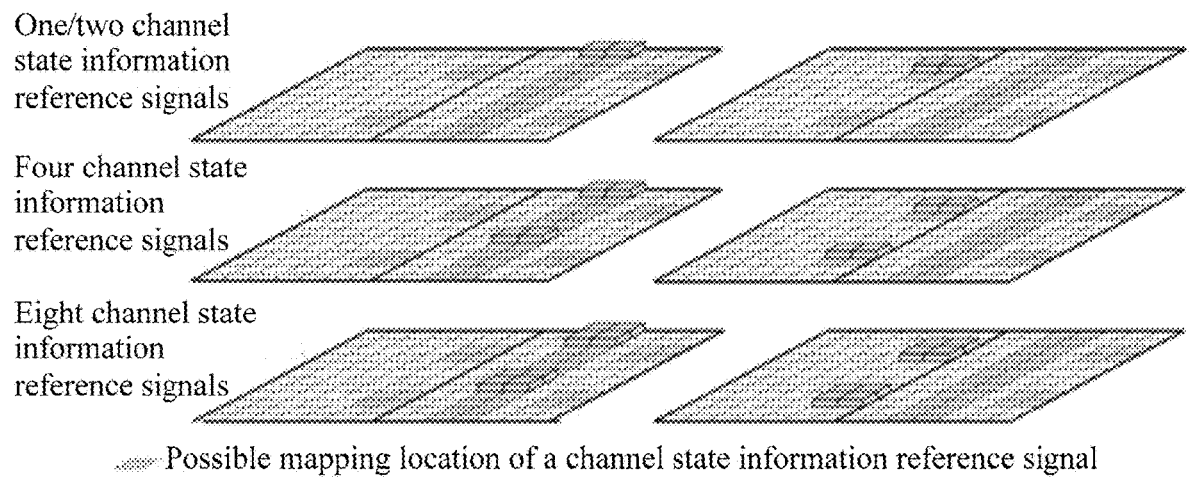
FIG. 1 is a CSI-RS mapping pattern in a conventional technology.
Figure 2:
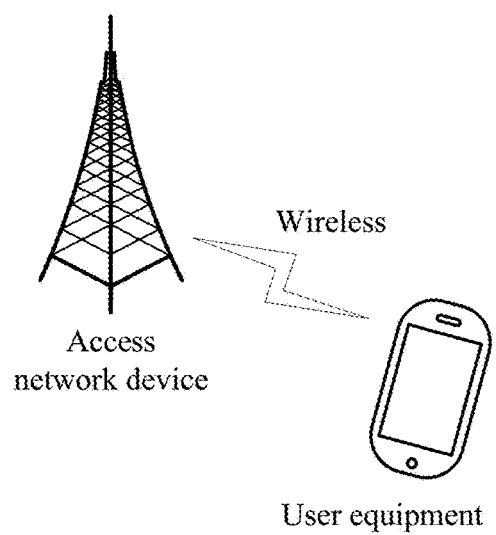
FIG. 2 is a schematic architecture diagram of a communications system according to an embodiment of the present invention.

Referring to FIG. 2, FIG. 2 is a schematic architecture diagram of a communications system according to an embodiment of the present invention. The communications system includes user equipment and an access network device. The user equipment and the access network device communicate with each other by using an air interface technology. The air interface technology may include existing 2G (for example, a Global System for Mobile Communications (GSM)), 3G (for example, a Universal Mobile Telecommunications System (UMTS), Wideband Code Division Multiple Access (WCDMA), and Time Division-Synchronous Code Division Multiple Access (TD-SCDMA)), 4G (for example, Frequency-Division Duplexing (FDD) LTE and Time-Division Duplexing (TDD) LTE), and a New RAT system, for example, a 4.5G or 5G system to be launched in the future.

The user equipment described in the embodiments of the present invention is described as UE in a common sense. In addition, the user equipment may also be referred to as a mobile console, an access terminal, a subscriber unit, a subscriber station, a mobile station, a remote station, a remote terminal, a mobile device, a user terminal, a terminal, a wireless communications device, a user agent, a user apparatus, or the like. A terminal device may be a station (ST) in a wireless local area network (WLAN), or may be a cellular phone, a cordless telephone set, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a mobile console in a future 5G network, a terminal device in a future evolved public land mobile network (PLMN), or the like. Moreover, in the embodiments of the present invention, the user equipment may further include a relay and another device that can perform data communication with the access network device (for example, a base station).

The access network device described in the embodiments of the present invention may be a device configured to communicate with the user equipment. Specifically, in a wireless communications system, the access network device is a device that communicates with the user equipment in a wireless manner. For example, the access network device may be an access point (AP) in a WLAN, or a base transceiver station (BTS) in GSM or CDMA; may be an NB (NodeB) in WCDMA; or may be an evolved NodeB (eNB) in LTE, a relay node, an access point, an in-vehicle device, a wearable device, an access network device in a future 5G network, an access network device in a future evolved PLMN, or the like.

Figure 3:
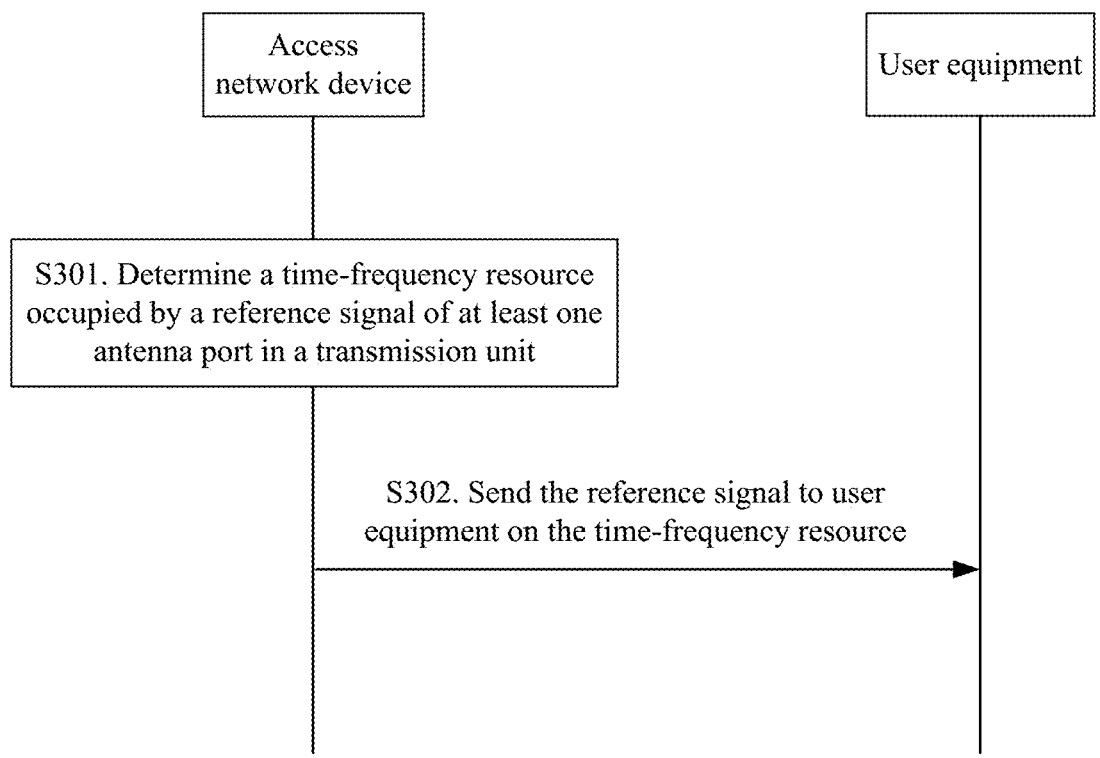
FIG. 3 is a schematic flowchart of a reference signal sending method according to an embodiment of the present invention.

Referring to FIG. 3, FIG. 3 is a schematic flowchart of a reference signal sending method according to an embodiment of the present invention. The method includes but is not limited to the following steps.

S301. An access network device determines a time-frequency resource occupied by a reference signal of at least one antenna port in a transmission unit.

Figure 3A:
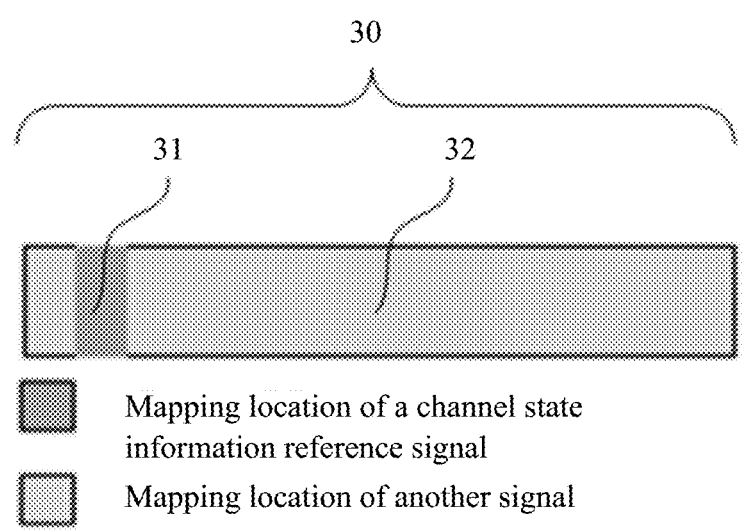
FIG. 3A is a schematic diagram of a transmission unit according to an embodiment of the present invention.

Before sending a reference signal to user equipment, the access network device maps all to-be-sent reference signals together to a single symbol or a plurality of consecutive symbols on a transmission resource, to avoid impact on data transmission caused by beam switching, and improve efficiency of measuring a reference signal. The transmission unit includes a first part and a second part. Specifically, referring to FIG. 3A, FIG. 3A is a schematic diagram of a transmission unit according to an embodiment of the present invention. In FIG. 3A, 30 represents the transmission unit, 31 represents the first part included in the transmission unit, and 32 represents the second part included in the transmission unit. Any symbol in the first part 31 is different from any symbol in the second part 32. In other words, the first part 31 does not overlap with the second part 32 in time domain. The time-frequency resource is on a single symbol or a plurality of consecutive symbols within the first part 31. Herein, the transmission unit is a transmission resource named in terms of time domain, and the transmission unit may be equivalent to a subframe in an existing LTE system. In this embodiment of the present invention, a time length of the transmission unit may be one millisecond. A subframe in the existing LTE system is used as an example for description. In a case of a normal cyclic prefix (NCP), a subframe includes 14 orthogonal frequency division multiplexing (OFDM) symbols; in a case of an extended cyclic prefix (ECP), a subframe includes 12 OFDM symbols. Certainly, a shorter subframe may be used in an LTE system that continues to be evolved in the future or another new wireless system. For example, a time length of a future subframe is equivalent to a time length of an existing OFDM symbol. It should be noted that in this embodiment of the present invention, a meaning of a transmission unit whose time length is N (N is a positive integer) symbols may be the same as that of a transmission time interval (TTI) whose time length is N symbols. A symbol in this embodiment of the present invention may be equivalent to an OFDM symbol in the existing LTE system. The symbol in this embodiment of the present invention may have other names, for example, a time unit.

It should be noted that the transmission unit described in this embodiment of the present invention may also be referred to as a time resource. The reference signal described in this embodiment of the present invention includes but is not limited to a reference signal used for channel measurement (equivalent to a CSI-RS in the existing LTE system).

For example, the access network device may determine, based on a network configuration (including a quantity of transmit/receive antennas, or the like), a supportable quantity of antenna ports corresponding to reference signals, and generate an independent reference signal original sequence. A generation manner of the original sequence includes but is not limited to a Gold sequence. The access network device determines, based on the quantity of ports corresponding to the reference signals, to map all reference signals of all determined antenna ports to the single symbol or the plurality of consecutive symbols on the transmission resource for transmission.

In addition, reference signals of each antenna port occupy a same symbol to avoid frequent beam switching, and the single symbol or each of the plurality of consecutive symbols carries a reference signal of at least one antenna port. To be specific, all reference signals of a plurality of antenna ports may jointly occupy one symbol (as shown in the schematic diagram); or when one symbol is not enough to carry all the reference signals of the plurality of antenna ports, the reference signals of the plurality of antenna ports may occupy the plurality of consecutive symbols, and each symbol carries a reference signal of at least one antenna port. For example, if there are eight antenna ports determined by the access network device, the access network device may map all reference signals of the eight antenna ports to one symbol in the transmission unit for transmission; or the access network device selects eight consecutive symbols from the transmission unit, where each symbol carries a reference signal of one antenna port; or the access network device selects two adjacent symbols from the transmission unit, where one symbol carries reference signals of two antenna ports, and the other symbol carries reference signals of the other six antenna ports.

Optionally, in this embodiment of the present invention, a reference signal and user data (or a control channel) may be multiplexed in a time division multiplexing (TDM) manner. The second part carries user data (or a control channel) that is sent by the access network device to the user equipment, and any symbol in the first part may be prior to any symbol in the second part. In other words, in time domain, a symbol occupied by the reference signal locates prior to a symbol occupied by the user data or the control channel, so that the user equipment feeds back, in a timely manner, feedback information corresponding to the reference signal. Specifically, refer to FIG. 3A. In FIG. 3A, 31 represents the first part, 32 represents the second part, the first part 31 carries the reference signal, and the second part 32 carries the user data. In a time domain dimension, the symbol occupied by the reference signal locates prior to the symbol occupied by the user data. For a channel state information reference signal, setting a symbol occupied by the channel state information reference signal to be prior to the symbol occupied by the user data or the control channel can help the user equipment feedback, in a timely manner, feedback information corresponding to channel state information. Optionally, this prevents beam scanning from affecting reliable transmission of another signal.

Figure 3B:
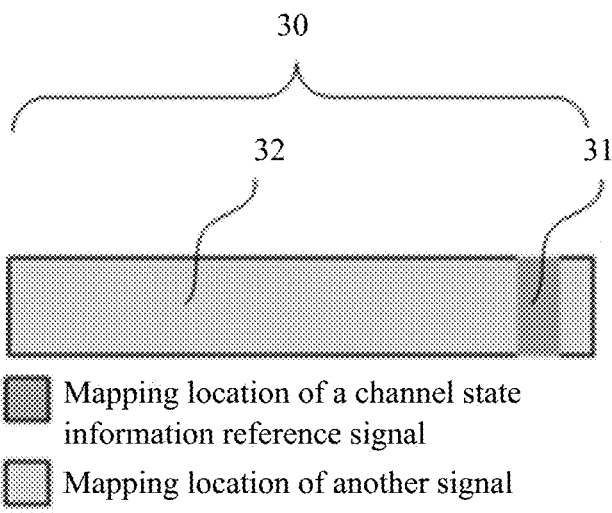
FIG. 3B is a schematic diagram illustrating that a symbol occupied by a reference signal is subsequent to a symbol occupied by user data (or a control channel)

Optionally, the second part carries user data (or a control channel) that is sent by the access network device to the user equipment, and any symbol in the first part may be subsequent to any symbol in the second part. In other words, in time domain, a symbol occupied by the reference signal is subsequent to a symbol occupied by the user data or the control channel, so that correctness of feedback information corresponding to the reference signal is ensured. Specifically, refer to FIG. 3B. In FIG. 3B, 31 represents the first part, 32 represents the second part, the first part 31 carries the reference signal, and the second part 32 carries the user data. In a time domain dimension, the symbol occupied by the reference signal is subsequent to the symbol occupied by the user data. For a channel state information reference signal, setting a symbol occupied by the channel state information reference signal to be subsequent to the symbol occupied by the user data (or the control channel) can improve correctness of channel state information feedback.

Optionally, the reference signal and the user data (or the control channel) may alternatively be multiplexed in a frequency division multiplexing (FDM) manner. For example, the user data and the reference signal are jointly mapped to a same symbol in the transmission unit, and the user data and the reference signal respectively occupy different subcarriers and then are transmitted.

Optionally, reference signals of different antenna ports may be multiplexed in a TDM, FDM, or CDM manner.

Figure 3C:
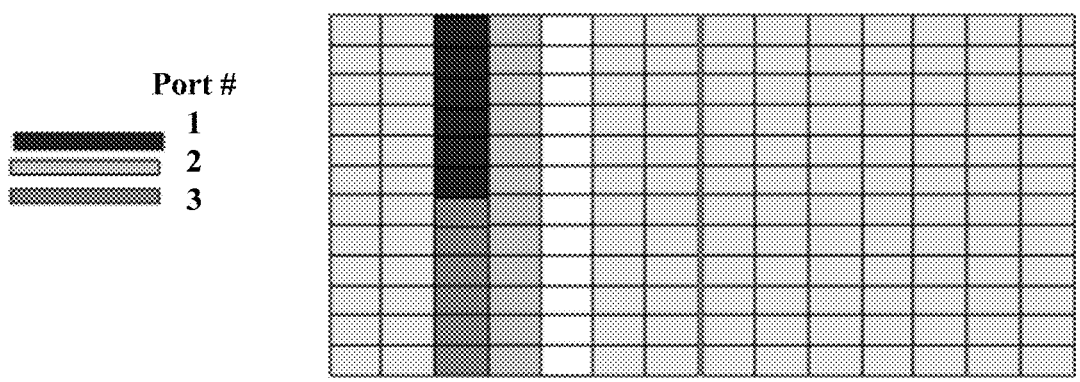
FIG. 3C is a mapping relationship diagram of reference signals of a plurality of antenna ports according to an embodiment of the present invention.
Figure 3D:
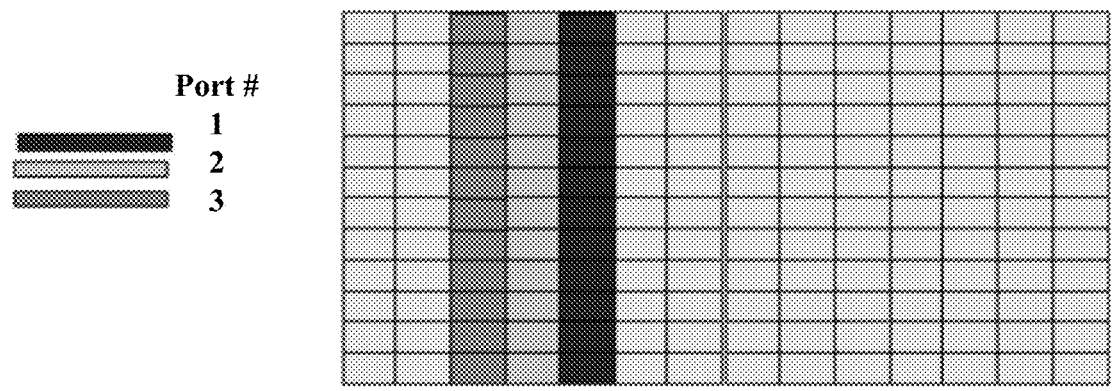
FIG. 3D is another mapping relationship diagram of reference signals of a plurality of antenna ports according to an embodiment of the present invention.
Figure 3E:
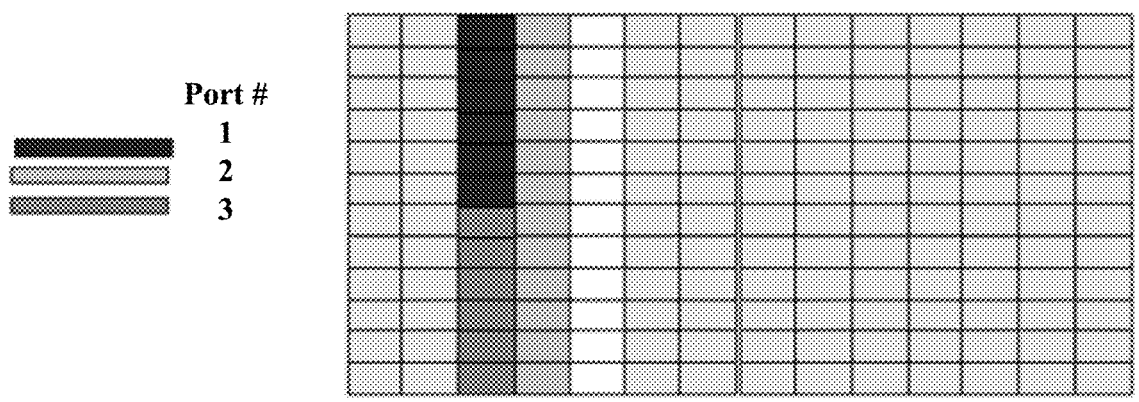
FIG. 3E is another mapping relationship diagram of reference signals of a plurality of antenna ports according to an embodiment of the present invention.

Specifically, referring to FIG. 3C, FIG. 3D, and FIG. 3E, FIG. 3C, FIG. 3D, and FIG. 3E are mapping diagrams of reference signals of a plurality of antenna ports in a transmission unit. In FIG. 3C, a reference signal of a port 1, a reference signal of a port 2, and a reference signal of a port 3 are multiplexed in an FDM manner. In FIG. 3D, a reference signal of a port 1, a reference signal of a port 2, and a reference signal of a port 3 are multiplexed in a TDM manner. In FIG. 3E, a reference signal of a port 1 and a reference signal of a port 2 are mapped to a same symbol in an FDM/CDM multiplexing manner, and both the reference signal of the port 1 and the reference signal of the port 2, and a reference signal of a port 3 are multiplexed in a TDM manner.

Optionally, when the single symbol or each of the plurality of consecutive symbols carries reference signals of a plurality of antenna ports, reference signals of different antenna ports on the single symbol or each of the plurality of consecutive symbols occupy different subcarriers. In other words, reference signals of different antenna ports on a same symbol are multiplexed in an FDM manner.

Optionally, when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing (CDM) manner. In other words, reference signals of different antenna ports on a same symbol are multiplexed in a CDM manner.

Optionally, the single symbol or each of the plurality of consecutive symbols is carried on a beam, where the beam is an analog beam (that is, analog beamforming), a digital beam, or a hybrid beam (that is, hybrid beamforming).

Optionally, the access network device may set a reference signal density, and configure the time-frequency resource based on the reference signal density. The reference signal density may be flexibly configured by the access network device, and is different from a constant density in the prior art: 1RE/physical resource block (PRB)/port. For example, the reference signal density configured by the access network device may be 4RE/PRB/port, that is, an antenna port occupies four REs on each PRB/RB. A new design solution allows configuration of density information, so that resource utilization is higher in terms of channel estimation.

Optionally, after configuring the time-frequency resource based on the reference signal density, the access network device informs the user equipment of the reference signal density, so that the user equipment can automatically match a reference signal mapping pattern sent by the access network device (different densities are corresponding to different mapping patterns, and the mapping patterns need to be the same at a receive end and a transmit end; otherwise, estimation cannot be performed or an estimation error occurs). Density adjustability is mainly used to improve resource utilization on the premise of ensuring channel estimation accuracy. For example, rough-information estimation does not require a high density; otherwise, resources are wasted and overheads are increased; when high transmission accuracy is required, a density may be increased to achieve a beneficial effect. Specifically, the access network device may add the reference signal density to an RRC message, and send, to the user equipment, the RRC message to which the reference signal density has been added; or the access network device adds the reference signal density to DCI information, and sends, to the user equipment, the DCI information to which the reference signal density has been added.

S302. The access network device sends the reference signal to user equipment on the time-frequency resource.

Optionally, the access network device may configure the time-frequency resource periodically/aperiodically, and inform the user equipment of the periodic/aperiodic configuration information by using signaling. Signaling content may be delivered by using an RRC message or DCI. For example, the access network device configures the time-frequency resource according to a target cycle, and sends the target cycle to the user equipment by using an RRC message. Specifically, an execution sequence of sending the target cycle and sending the reference signal is not limited herein. However, in an aperiodic configuration manner, the access network device needs to send reference signal indication information to the user equipment, to inform the user equipment that the access network device is to send the reference signal to the user equipment. Specifically, an RRC or DCI indication may be used to inform the user equipment of the reference signal indication information. During measurement of rough information/long-term statistical information, periodic sending may be performed. For obtaining instantaneous channel information, aperiodic transmission may be performed, for example, an on-demand transmission mode is used. The new design solution uses a periodic indication, so that resource utilization is higher in terms of channel estimation.

Optionally, different measurement reference signal mapping patterns may be used for different subbands in this embodiment of the present invention. For each subband in entire bandwidth, for mapping patterns of subbands, reference signals may be mapped in the foregoing joint mapping manner, and reference signal densities and periodic/aperiodic configuration information of the subbands may be configured separately, so that subband configurations are more flexible.

In conclusion, the reference signal mapping manner that satisfies a beamforming requirement in a new wireless access system is designed, and reference signals of a plurality of antenna ports are mapped together, thereby improving reference signal transmission efficiency. The reference signal mapping manner is more suitable for an analog/hybrid beamforming architecture, and is also applicable to a fully digital beamforming architecture. For the analog/hybrid beamforming architecture, mapping reference signals corresponding to a plurality of antenna ports together can avoid impact on data transmission caused by beam switching, and improve channel estimation efficiency. In addition, by sending periodic/aperiodic configuration information and density prompt information, resource utilization is improved on the premise of ensuring channel estimation accuracy. This reduces resource overheads to some extent.

To better implement the uplink information transmission method in this embodiment of the present invention, an embodiment of the present invention further provides a terminal device configured to implement the foregoing method.

Figure 4:
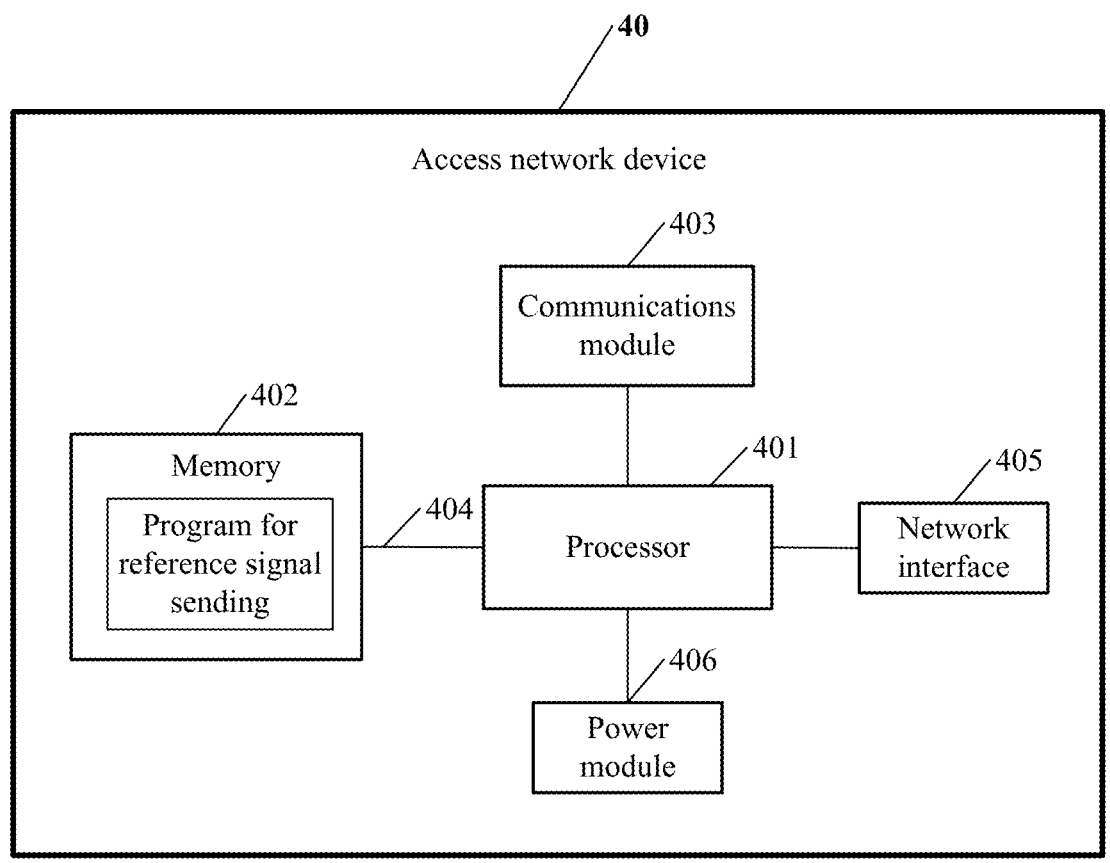
FIG. 4 is a schematic structural diagram of an access network device according to an embodiment of the present invention.

Referring to FIG. 4, FIG. 4 is a schematic structural diagram of an access network device according to an embodiment of the present invention. As shown in FIG. 4, the access network device 40 includes a processor 401, a memory 402, a communications module 403, and a bus 404. The processor 401, the memory 402, and the communications module 403 may be connected by using a bus or in another manner. In FIG. 4, for example, connection is implemented by using the bus 404.

Optionally, the access network device 40 may further include a network interface 405 and a power module 406.

The processor 401 may be a digital signal processing (DSP) chip. The processor 401 is configured to: manage a radio channel, control a handover of user equipment in a local control area, and the like. In a specific implementation, the processor 401 may include modules such as an administration module/communication module (AM/CM) module (used as a center of speech channel switching and information exchange), a basic module (BM) module (configured to implement call processing, signaling processing, radio resource management, radio link management, and circuit maintenance functions), and a transcoder and submultiplexer (TCSM) module (configured to implement multiplexing, demultiplexing, and transcoding functions). For specific information, refer to related knowledge about mobile communications.

The memory 402 is configured to store program code for reference signal sending. In a specific implementation, the memory 402 may be a read-only memory (ROM) or a random access memory (RAM), and may be configured to store program code.

The communications module 403 is configured to perform transmission processing (for example, modulation) on a mobile communication signal generated by the processor 401, and is further configured to perform receiving processing (for example, demodulation) on a mobile communication signal received by an antenna.

The bus 404 may be an Industry Standard Architecture (ISA) bus, a Peripheral Component Interconnect (PCI) bus, an Extended Industry Standard Architecture (EISA) bus, an inter-integrated circuit (IIC) bus, or the like.

The network interface 405 is used for data communication between the access network device 40 and a terminal (a mobile station in 2G or a UE in 3G or 4G). In a specific implementation, the network interface 405 may include one or more of a GSM (2G) wireless network interface, a WCDMA (3G) wireless network interface, an LTE (4G) wireless network interface, and the like, or may be a future 4.5G or 5G wireless network interface.

The power module 406 is configured to supply power to each module of the access network device 40.

In this embodiment of the present invention, the processor 401 is further configured to invoke the program code in the memory 402, to perform the following operations:

determining, by the processor 401, a time-frequency resource occupied by a reference signal of at least one antenna port in a transmission unit, where the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port; and sending, by the processor 401, the reference signal to user equipment on the time-frequency resource by using the communications module 403.

According to the foregoing operations, reference signals of a plurality of antenna ports are mapped together, thereby improving reference signal transmission efficiency.

It should be noted that the access network device 40 is applicable to a 2G communications system (for example, GSM), a 3G communications system (for example, UMTS), a 4G communications system (LTE), and a future 4.5G or 5G communications system.

Optionally, after the processor 401 determines the time-frequency resource occupied by the reference signal of the at least one antenna port in the transmission unit, and before the processor 401 sends the reference signal to the user equipment on the time-frequency resource by using the communications module 403, the processor 401 is further configured to configure the time-frequency resource based on a target reference signal density value; and the processor 401 is further configured to send the target reference signal density value to the user equipment by using the communications module 403.

According to the foregoing operations, the access network device can flexibly configure a mapping density of the reference signal.

Optionally, the sending, by the processor 401, the target reference signal density value to the user equipment by using the communications module 403 includes: adding, by the processor 401, the target reference signal density value to an RRC message, and sending, to the user equipment by using the communications module 403, the RRC message to which the target reference signal density value has been added; or adding, by the processor 401, the target reference signal density value to DCI, and sending, to the user equipment by using the communications module 403, the DCI to which the target reference signal density value has been added.

Optionally, the sending, by the processor 401, the reference signal to user equipment on the time-frequency resource by using the communications module 403 includes: sending, by the processor 401, the reference signal to the user equipment on the time-frequency resource by using the communications module 403 according to a target cycle; and the processor 401 is further configured to send the target cycle to the user equipment by using the communications module 403.

According to the foregoing operations, the access network device can flexibly configure the transmission cycle of the reference signal.

Optionally, the sending, by the processor 401, the target cycle to the user equipment by using the communications module 403 includes: adding, by the processor 401, the target cycle to an RRC message, and sending, to the user equipment by using the communications module 403, the RRC message to which the target cycle has been added; or adding, by the processor 401, the target cycle to DCI, and sending, to the user equipment by using the communications module 403, the DCI to which the target cycle has been added.

Optionally, the processor 401 is further configured to send reference signal indication information to the user equipment by using the communications module 403, where the reference signal indication information is used to indicate that the access network device is to send the reference signal of the at least one antenna port to the user equipment. The access network device may transmit the reference signal to the user equipment aperiodically.

Optionally, the sending, by the processor 401, reference signal indication information to the user equipment by using the communications module 403 includes: adding, by the processor 401, the reference signal indication information to an RRC message, and sending, to the user equipment by using the communications module 403, the RRC message to which the reference signal indication information has been added; or adding, by the processor 401, the reference signal indication information to DCI, and sending, to the user equipment by using the communications module 403, the DCI to which the reference signal indication information has been added.

Optionally, the symbol in the first part locates prior to the symbol in the second part.

Optionally, when the single symbol or each of the plurality of consecutive symbols carries reference signals of a plurality of antenna ports, reference signals of different antenna ports on the single symbol or each of the plurality of consecutive symbols occupy different subcarriers.

Optionally, when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

Optionally, the reference signal is a reference signal used for channel measurement.

It should be noted that for a function of each function module of the access network device 40 described in this embodiment of the present invention, refer to the related description of the corresponding access network device in the embodiment shown in FIG. 3. Details are not described herein again.

Figure 5:
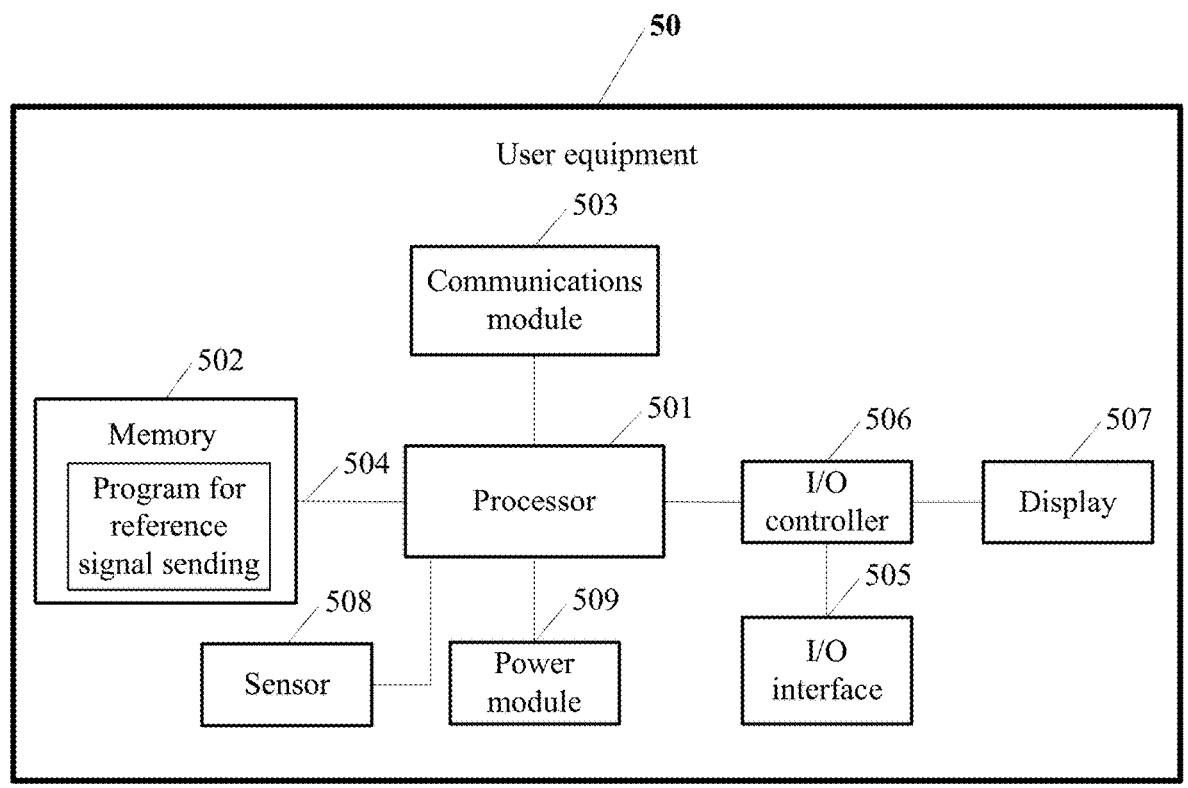
FIG. 5 is a schematic structural diagram of user equipment according to an embodiment of the present invention.

Referring to FIG. 5, FIG. 5 is a schematic structural diagram of user equipment according to an embodiment of the present invention. As shown in FIG. 5, the user equipment 50 includes a processor 501, a memory 502, a communications module 503, and a bus 504. The processor 501, the memory 502, and the communications module 503 may be connected by using a bus or in another manner. In FIG. 5, for example, connection is implemented by using the bus 504.

Optionally, the user equipment 50 may further include an I/O interface 505, an I/O controller 506, a display 507, a sensor 508, and a power module 509.

The processor 501 may be a general-purpose processor, for example, a CPU, and is configured to run operating system software, required application program software, and the like of the user equipment 50. The processor 501 may process data that is received by using the communications module 503. The processor 501 may further process data that is to be sent to the communications module 503 for wireless transmission.

The memory 502 is configured to: store program code for reference signal sending, and complete storage of various software programs and data, software running, and the like of a terminal device. The memory 502 may include a volatile memory, for example, a RAM. The memory 502 may alternatively include a non-volatile memory, for example, a ROM, a hard disk drive (HDD), or a solid-state drive (SSD). The memory 502 may alternatively include a combination of the foregoing types of memories.

The communications module 503 provides a communication function for the user equipment 50, is configured to perform transmission processing (for example, amplification, modulation, and encoding) on a mobile communication signal generated by the processor 501, and is further configured to perform receiving processing (for example, demodulation and decoding) on a mobile communication signal received by an antenna. The communications module 503 is applicable to a cellular network, for example, a GSM, UMTS, LTE, or CDMA network, and may also be applicable to one or more of a WLAN, an NFC network, a Bluetooth network, and the like.

The bus 504 may be an ISA bus, a PCI bus, an EISA bus, an IIC bus, or the like.

The I/O interface 505 is an external interface of the user equipment 50, and includes one or more of a USB interface, an SD card interface, a key interface, and the like.

The I/O controller 506 in the user equipment 50 is configured to control data exchange between various input/output devices, especially including data exchange between the processor 501, the I/O interface 505, and the display 507.

The display 507 is a display screen and a touchscreen of the user equipment 50. The display 507 is configured to display a software running status, a battery level status, time, a user configuration screen, and a configuration result of the user equipment 50. The touchscreen is configured to receive a user touch operation and convert the operation into a user operation instruction.

The sensor 508 includes various sensor devices, including one or more of a GPS module, a gravity sensor, an acceleration sensor, a distance sensor, a camera, an optical sensor, and the like.

The power module 509 supplies power to each module of the user equipment 50.

In this embodiment of the present invention, the processor 501 is mainly configured to invoke the program stored in the memory 502, to perform the following operation:

receiving, by the processor 501 by using the communications module 503, a reference signal that is sent by an access network device on a time-frequency resource, where the time-frequency resource is a time-frequency resource that is occupied by a reference signal of at least one antenna port in a transmission unit and that is determined by the access network device, the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port.

Optionally, the processor 501 is further configured to receive, by using the communications module 503, a target reference signal density value sent by the access network device, where the target reference signal density value is a reference signal density value used by the access network device to configure the time-frequency resource.

Optionally, the receiving, by using the communications module 503, a target reference signal density value sent by the access network device includes: receiving, by using the communications module 503, the target reference signal density value that is sent by the access network device by using an RRC message or DCI.

Optionally, the processor 501 is further configured to receive, by using the communications module 503, a target cycle sent by the access network device, where the target cycle is a cycle used by the access network device to send the reference signal.

Optionally, the receiving, by using the communications module 503, a target cycle sent by the access network device includes: receiving, by using the communications module 503, the target cycle that is sent by the access network device by using an RRC message or DCI.

Optionally, the processor 501 is further configured to receive, by using the communications module 503, reference signal indication information sent by the access network device, where the reference signal indication information is used to indicate that the access network device is to send the reference signal of the at least one antenna port to the user equipment.

Optionally, the receiving, by using the communications module 503, reference signal indication information sent by the access network device includes: receiving, by using the communications module 503, the reference signal indication information that is sent by the access network device by using an RRC message or DCI.

Optionally, the symbol in the first part locates prior to the symbol in the second part.

Optionally, when the single symbol or each of the plurality of consecutive symbols carries reference signals of a plurality of antenna ports, reference signals of different antenna ports on the single symbol or each of the plurality of consecutive symbols occupy different subcarriers.

Optionally, when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

Optionally, the reference signal is a reference signal used for channel measurement.

It should be noted that for a function of each function module of the user equipment 50 described in this embodiment of the present invention, refer to the related description of the corresponding user equipment in the embodiment shown in FIG. 3. Details are not described herein again.

Figure 6:
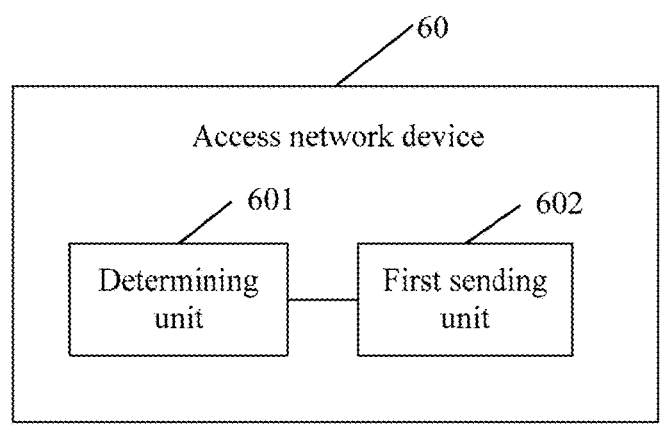
FIG. 6 is a schematic structural diagram of another access network device according to an embodiment of the present invention.

Referring to FIG. 6, FIG. 6 is a schematic structural diagram of another access network device according to an embodiment of the present invention. As shown in FIG. 6, the access network device 60 includes a determining unit 601 and a first sending unit 602.

The determining unit 601 is configured to determine a time-frequency resource occupied by a reference signal of at least one antenna port in a transmission unit, where the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port.

The first sending unit 602 is configured to send the reference signal to user equipment on the time-frequency resource.

In this embodiment, the access network device 60 is presented in a form of a function unit. The "unit" herein may be an application-specific integrated circuit (ASIC), a processor executing one or more software or firmware programs, a memory, an integrated logic circuit, and/or another device that can provide the foregoing functions. The access network device 60 may be in a form shown in FIG. 4. The determining unit 601 and the first sending unit 602 may be implemented by the processor 401 in FIG. 4.

Optionally, the access network device 60 further includes a configuration unit, configured to: after the determining unit 601 determines the time-frequency resource occupied by the reference signal of the at least one antenna port in the transmission unit, and before the first sending unit 602 sends the reference signal to the user equipment on the time-frequency resource, configure the time-frequency resource based on a target reference signal density value; and the access network device 60 further includes a second sending unit, configured to send the target reference signal density value to the user equipment.

According to the foregoing operations, the access network device can flexibly configure a mapping density of the reference signal.

Optionally, the second sending unit is specifically configured to: add the target reference signal density value to an RRC message, and send, to the user equipment, the RRC message to which the target reference signal density value has been added; or add the target reference signal density value to DCI, and send, to the user equipment, the DCI to which the target reference signal density value has been added.

Optionally, the first sending unit 602 is specifically configured to send the reference signal to the user equipment on the time-frequency resource according to a target cycle; and the access network device 60 further includes a third sending unit, configured to send the target cycle to the user equipment.

According to the foregoing operations, the access network device can flexibly configure the transmission cycle of the reference signal.

Optionally, the third sending unit is specifically configured to: add the target cycle to an RRC message, and send, to the user equipment, the RRC message to which the target cycle has been added; or add the target cycle to DCI, and send, to the user equipment, the DCI to which the target cycle has been added.

Optionally, the access network device 60 further includes a fourth sending unit, configured to send reference signal indication information to the user equipment, where the reference signal indication information is used to indicate that the access network device is to send the reference signal of the at least one antenna port to the user equipment. The access network device may transmit the reference signal to the user equipment aperiodically.

Optionally, the fourth sending unit is specifically configured to: add the reference signal indication information to an RRC message, and send, to the user equipment, the RRC message to which the reference signal indication information has been added; or add the reference signal indication information to DCI, and send, to the user equipment, the DCI to which the reference signal indication information has been added.

It should be noted that for a function of each function unit of the access network device 60 described in this embodiment of the present invention, refer to the related description of the access network device in the embodiment shown in FIG. 3. Details are not described herein again.

Figure 7:
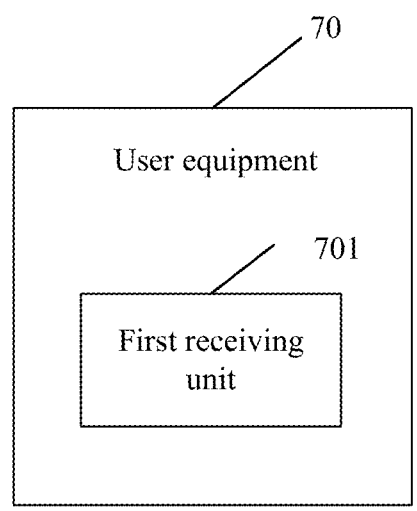
FIG. 7 is a schematic structural diagram of another user equipment according to an embodiment of the present invention.

Referring to FIG. 7, FIG. 7 is a schematic structural diagram of another user equipment according to an embodiment of the present invention. As shown in FIG. 7, the user equipment 70 includes a first receiving unit 701.

The first receiving unit 701 is configured to receive a reference signal that is sent by an access network device on a time-frequency resource, where the time-frequency resource is a time-frequency resource that is occupied by a reference signal of at least one antenna port in a transmission unit and that is determined by the access network device, the transmission unit includes a first part and a second part, any symbol in the first part is different from any symbol in the second part, the time-frequency resource is on a single symbol or a plurality of consecutive symbols within the first part, reference signals of each antenna port occupy a same symbol, and the single symbol or each of the plurality of consecutive symbols carries a reference signal of at least one antenna port.

In this embodiment, the user equipment 70 is presented in a form of a function unit. The "unit" herein may be an ASIC, a processor executing one or more software or firmware programs, a memory, an integrated logic circuit, and/or another device that can provide the foregoing functions. The user equipment 70 may be in a form shown in FIG. 5. The first receiving unit 701 may be implemented by the processor 501 in FIG. 5, or may be implemented by the communications module 503 in FIG. 5.

Optionally, the user equipment 70 further includes a second receiving unit, configured to receive a target reference signal density value sent by the access network device, where the target reference signal density value is a reference signal density value used by the access network device to configure the time-frequency resource.

Optionally, the second receiving unit is specifically configured to receive, by using the communications module, the target reference signal density value that is sent by the access network device by using an RRC message or DCI.

Optionally, the user equipment 70 further includes a third receiving unit, configured to receive a target cycle sent by the access network device, where the target cycle is a cycle used by the access network device to send the reference signal.

Optionally, the third receiving unit is specifically configured to receive the target cycle that is sent by the access network device by using an RRC message or DCI.

Optionally, the user equipment 70 further includes a fourth receiving unit, configured to receive reference signal indication information sent by the access network device, where the reference signal indication information is used to indicate that the access network device is to send the reference signal of the at least one antenna port to the user equipment.

Optionally, the fourth receiving unit is specifically configured to receive the reference signal indication information that is sent by the access network device by using an RRC message or DCI.

It should be noted that for a function of each function unit of the user equipment 70 described in this embodiment of the present invention, refer to the related description of the user equipment in the embodiment shown in FIG. 3. Details are not described herein again.

To better implement the embodiments of the present invention, an embodiment of the present invention further provides a computer readable storage medium. The computer readable storage medium stores one or more computer programs, and the computer readable storage medium may be a magnetic disk, an optical disc, a ROM, a RAM, or the like. The one or more computer programs run on one or more processors of an access network device. When the computer program runs, the procedure corresponding to the access network device in the method embodiment shown in FIG. 3 can be implemented. The one or more computer programs run on one or more processors of user equipment. When the computer program runs, the procedure corresponding to the user equipment in the method embodiment shown in FIG. 3 can be implemented.

Although the embodiments of the present invention are described herein with reference to the embodiments, the protection scope of the claims of the embodiments of the present invention should not be limited by the description. In a process of implementing the embodiments of the present invention that claim protection, a person skilled in the art may understand and implement all or some procedures in the foregoing embodiments by viewing the accompanying drawings, disclosed content, and the accompanying claims. Equivalent modifications made in accordance with the claims of the embodiments of the present invention shall fall within the scope of the present invention. In the claims, "comprising" does not exclude another component or another step, and "a" or "one" does not exclude a case of "a plurality of". A single controller or another unit may implement several functions enumerated in the claims. Some measures are recorded in dependent claims that are different from each other, but this does not mean that these measures cannot be combined to produce a better effect. The computer program may be stored/distributed in a proper medium, for example, an optical storage medium or a solid state medium, and is provided as or used as a part of the hardware together with other hardware, or may be distributed in another form, for example, by using the Internet or another wired or wireless system.

What is claimed is:

1. A reference signal sending method, comprising:
determining, by an access network device, a time-frequency resource occupied by a reference signal of at least one antenna port in a transmission unit, the transmission unit comprising a first part and a second part, wherein any symbol in the first part is different from any symbol in the second part, wherein the time-frequency resource is on a single symbol or a plurality of consecutive symbols within the first part, wherein reference signals of each antenna port occupy a same symbol, and wherein the single symbol or each of the plurality of consecutive symbols carries the reference signal of at least one antenna port;
configuring, by the access network device, the time-frequency resource based on a target reference signal density value, wherein the target reference signal density value is a reference signal density value; and
sending, by the access network device, the reference signal and the target reference signal density value to a user equipment on the time-frequency resource.

2. The method according to claim 1, wherein symbols in the first part are located prior to symbols in the second part.

3. The method according to claim 1, wherein when the single symbol or each of the plurality of consecutive symbols carries reference signals of a plurality of antenna ports, reference signals of different antenna ports on the single symbol or each of the plurality of consecutive symbols occupy different subcarriers.

4. The method according to claim 1, wherein when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

5. The method according to claim 1, wherein the reference signal is a reference signal used for channel measurement.

6. The method according to claim 1, wherein sending, by the access network device, the target reference signal density value to the user equipment further includes:
adding, by the access network device, the target reference signal density value to a radio resource control (RRC) message; and
sending, by the access network device, the RRC message to the user equipment.

7. The method according to claim 1, further comprising:
adding, by the access network device, the target reference signal density value to downlink control information (DCI); and
sending, by the access network device, the DCI to which the target reference signal density value has been added.

8. A reference signal sending method, comprising:
receiving, by a user equipment, a reference signal from an access network device on a time-frequency resource, wherein the time-frequency resource is a time-frequency resource that is occupied by a reference signal of at least one antenna port in a transmission unit and that is determined by the access network device, wherein the transmission unit comprises a first part and a second part, wherein any symbol in the first part is different from any symbol in the second part, wherein the time-frequency resource is on a single symbol or a plurality of consecutive symbols within the first part, wherein reference signals of each antenna port occupy a same symbol, and wherein the single symbol or each of the plurality of consecutive symbols carries the reference signal of at least one antenna port; and
receiving, by the user equipment, the reference signal and a target reference signal density value sent by the access network device, wherein the target reference signal density value is a reference signal density value used by the access network device to configure the time-frequency resource.

9. The method according to claim 8, wherein symbols in the first part are located prior to symbols in the second part.

10. The method according to claim 8, wherein when the single symbol or each of the plurality of consecutive symbols carries reference signals of a plurality of antenna ports, reference signals of different antenna ports on the single symbol or each of the plurality of consecutive symbols occupy different subcarriers.

11. The method according to claim 8, wherein when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

12. The method according to claim 8, wherein the reference signal is a reference signal used for channel measurement.

13. The method according to claim 8, wherein receiving, by the user equipment, a target reference signal density value sent by the access network device further includes:
receiving, by the user equipment, the target reference signal density value that is sent by the access network device by using a radio resource control (RRC) message.

14. The method according to claim 8, wherein receiving, by the user equipment, a target reference signal density value sent by the access network device further includes:
receiving, by the user equipment, the target reference signal density value that is sent by the access network device by using downlink control information (DCI).

15. A user equipment comprising:
a non-transitory computer readable medium configured to store program code; and
a processor configured to invoke the program code to facilitate performing:
receiving a reference signal from an access network device on a time-frequency resource, wherein the time-frequency resource is a time-frequency resource that is occupied by a reference signal of at least one antenna port in a transmission unit and that is determined by the access network device, wherein the transmission unit comprises a first part and a second part, any symbol in the first part is different from any symbol in the second part, wherein the time-frequency resource is on a single symbol or a plurality of consecutive symbols within the first part, wherein reference signals of each antenna port occupy a same symbol, and wherein the single symbol or each of the plurality of consecutive symbols carries the reference signal of at least one antenna port; and
receiving the reference signal and a target reference signal density value sent by the access network device, wherein the target reference signal density value is a reference signal density value used by the access network device to configure the time-frequency resource.

16. The user equipment according to claim 15, wherein symbols in the first part are located prior to symbols in the second part.

17. The user equipment according to claim 15, wherein when the single symbol or each of the plurality of consecutive symbols carries reference signals of a plurality of antenna ports, reference signals of different antenna ports on the single symbol or each of the plurality of consecutive symbols occupy different subcarriers.

18. The user equipment according to claim 15, wherein when the single symbol or each of the plurality of consecutive symbols carries reference signals of a plurality of antenna ports, reference signals of at least two antenna ports on the single symbol or each of the plurality of consecutive symbols are carried on a same subcarrier in a code division multiplexing manner.

19. The user equipment according to claim 15, wherein the reference signal is a reference signal used for channel measurement.

20. The user equipment according to claim 15, wherein receiving the target reference signal density value sent by the access network device, the processor is configured to invoke the program code to further facilitate performing:
    receiving the target reference signal density value that is sent by the access network device by using a radio resource control (RRC) message or downlink control information (DCI).

\* \* \* \* \*